United States Patent [19]

Hirakawa

[11] 4,127,737
[45] Nov. 28, 1978

[54] APPARATUS FOR REACTIVATION OF ACTIVE CARBON AND THE LIKE

[75] Inventor: Kazusa Hirakawa, Higashiyamato, Japan

[73] Assignee: Accord Mech. Kabushiki Kaisha, Japan

[21] Appl. No.: 774,121

[22] Filed: Mar. 3, 1977

[30] Foreign Application Priority Data

Mar. 5, 1976 [JP] Japan .............................. 51-26221[U]
Mar. 12, 1976 [JP] Japan .................................. 51-26803

[51] Int. Cl.² ........................ F27B 7/14; F27D 11/04; H05B 3/60
[52] U.S. Cl. ............................................. 13/7; 13/23; 252/411 R; 252/420
[58] Field of Search .................... 13/7, 23; 252/411 R, 252/420; 219/284, 291

[56] References Cited

U.S. PATENT DOCUMENTS

| | | | |
|---|---|---|---|
| 1,593,879 | 7/1926 | Naugle | 13/7 |
| 1,601,222 | 9/1926 | Naugle | 13/7 |
| 2,359,910 | 10/1944 | Goss | 13/7 |

Primary Examiner—R. N. Envall, Jr.
Attorney, Agent, or Firm—Robert E. Burns; Emmanuel J. Lobato; Bruce L. Adams

[57] ABSTRACT

The rotary drum of reactivation apparatus has spaced-apart helical electrodes disposed in mutually interposed helical state and fixed to the inner wall surface of the drum, these electrodes functioning upon rotation of the drum to propel by screw action active carbon from an inlet end to the other outlet end of the drum as electric power is supplied to the electrodes to cause electric discharge therebetween and conduction through the carbon, which is thereby subjected sequentially to drying, firing, and reactivation as a result of electric discharge effect and the resulting joule heat. Flow of excessive current between the electrodes is prevented by a constant-current circuit in the electric power supply system. Steam can be additionally injected against the carbon to promote the reactivation thereof.

8 Claims, 11 Drawing Figures

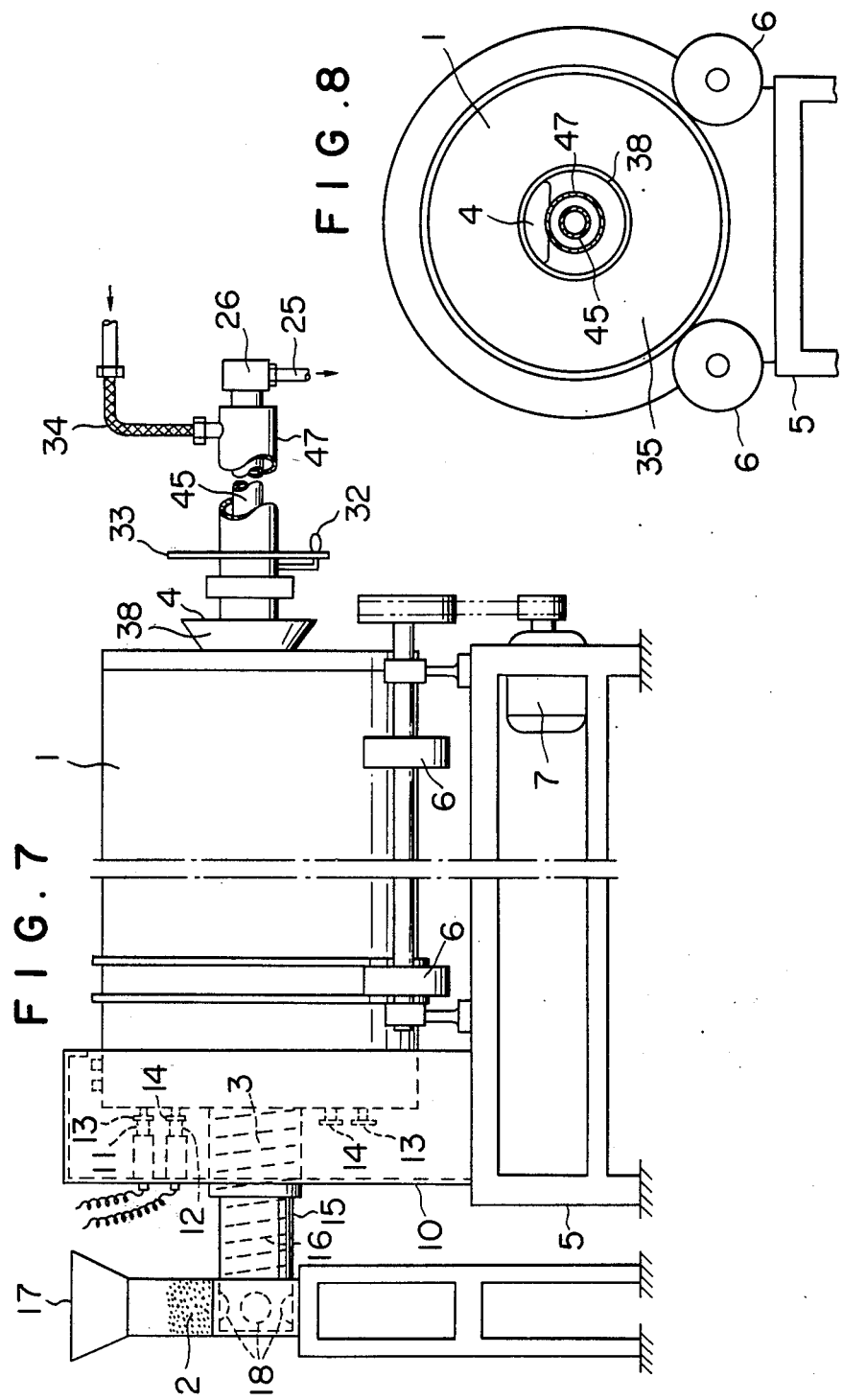

APPARATUS FOR REACTIVATION OF ACTIVE CARBON AND THE LIKE

BACKGROUND OF THE INVENTION

This invention relates generally to active carbon and the like and reactivation or revivification thereof and more particularly to an activation and revivification (hereinafter referred to as reactivation) apparatus which is highly suitable for the reactivation of active carbon.

Heretofore, reactivation of active carbon has been generally carried out by causing the carbon to undergo planar movement of a cascade movement through a hot space or over a hot surface heated by the combustion of a heat source such a fuel oil, gas fuel, or kerosene (paraffin oil) and, during this carbon movement, subjecting it to drying, firing, and steam injection.

By this known process, however, parts of the apparatus therefor must be made heat resistant to continually withstand high temperatures of the order of 90° to 950° C., but it is difficult to prolong the heat resisting life of the entire apparatus. For this purpose, large quantities of high-priced materials must be used, whereby the apparatus construction cost rises, and, moreover, a separate fuel combustion device becomes necessary. Furthermore, a large quantity of fuel becomes necessary. All of these problems combine to elevate the operational cost.

Still another difficulty is that a large space is required for carrying out the process steps of drying, firing, and reactivation, and the entire apparatus becomes considerably bulky and expensive. Moreover, a great quantity of active carbon must be processed in order to fully utilized this apparatus, and this gives rise to the generation of a large quantity of harmful gases leading to a pollution problem. Equipment for preventing the discharging of these exhaust gases or for processing these gases further increases the complexity and bulk of the apparatus. The ultimate result is that the fuel cost, labor cost, transportation, etc., are tremendously increased and have a great effect on the cost of operation, whereby the price of the active carbon thus reactivated approaches that of newly produced active carbon.

One solution which would appear to be possible for the above described problems of the prior-art reactivation apparatus comprises abandoning the use of conventional fuel as a heat source and causing the active carbon to pass between electrodes thereby to cause an electrical conduction and discharge effect, the joule heat thus generated being utilized to accomplish reactivation.

One specific form of apparatus which would appear to be suitable for solution comprises, essentially, a cylindrical drum structure and several anodes and cathodes installed alternately on the inner wall surface of the drum structure in the axial direction thereof, the drum structure being adapted to rotate about its axis, which is inclined, and to receive at its upper end active carbon to be reactivated. Then, when this drum structure is rotated, the active carbon flows downward as it contacts alternately the anodes and cathodes. During this process, according to design, the carbon is resistance heated by the electrical conduction and discharging action which occurs while it moves in interposed state between the anodes and cathodes and is thereby reactivated.

In this apparatus, however, the active carbon tends to move intermittently as groups of particles between the electrodes when the drum structure is rotated, whereby the agitation is insufficient, and, furthermore, there are instances in which the active carbon is not in a state of continual contact with the anodes and cathodes. In such instances, the electrical conduction and discharge action is not accomplished smoothly, and cases wherein the active carbon reaches the outlet of the apparatus without even being dried readily occur. Another problem is the difficulty of selecting the proper angle of inclination of the axis of the drum structure.

SUMMARY OF THE INVENTION

In view of the above described circumstances, it is an object of this invention to provide a reactivation apparatus of the construction described hereinafter, in which the above described problems arising from the use of electrodes without the use of any heating fuel have all been solved.

Another object of this invention is to provide means for automatically controlling the current of the electric power supplied to the electrodes in the reactivation apparatus thereby to prevent it from exceeding a preset value.

A further object of the invention is to provide a reactivation apparatus having a heating steam supplying system for supplying heating steam efficiently into the reactivation apparatus and causing the material being reactivated to react effectively with the steam thereby to reactivate the material.

According to this invention in one aspect thereof, briefly summarized, there is provided an apparatus for reactivation of a material in granular form, comprising: a hollow cylindrical drum made of heat-resistant material and supported rotatably about the centerline axis thereof, said drum having an inlet at one end thereof for feeding said material thereinto and an outlet at the other end thereof for discharging said material after reactivation therefrom; motive power means for driving the drum in rotation about said axis; helical electrodes of mutually different polarity disposed in mutually interposed helical state with a constant spacing therebetween around and along substantially the entire inner wall surface of the drum and fixed to said surface, said electrodes functioning upon rotation of the drum to propel by screw action the material from said inlet to said outlet; and means for supplying electric power to said electrodes for causing electric discharge therebetween and conduction through the material being thus propelled thereby to subject the material sequentially to drying, firing, and reactivation as a result of electric discharge effect and the resulting joule heat.

According to this invention in another aspect thereof, there is provided a reactivation apparatus as summarized above in which the material is active carbon, and a constant-current circuit is provided in the means for supplying electric power and operates to prevent any current greater than a preset current value from flowing between the electrodes.

According to this invention in a further aspect thereof, there is provided a reactivation apparatus as summarized above in which there is provided a steam injection system comprising steam generating means, a steam delivery line, a steam supplying pipe supplied with steam from said steam generating means through said delivery line, nozzle devices disposed in the vicinity of said electrodes and said material being propelled and supplied with steam from said steam supply pipe thereby to inject steam against said material and thereby to promote the reactivation thereof, and means controllable from outside of the drum to adjust the positions of said nozzle devices relative to the material and electrodes.

The nature, utility, and further features of this invention will be apparent from the following detailed description with respect to preferred embodiments of the invention when read in conjunction with the accompanying drawings briefly described below, throughout which like parts are designated by like reference numerals and characters.

BRIEF DESCRIPTION OF THE DRAWINGS

In the drawings:

FIGS. 7, 8, 9, and 11 are respectively a side elevation, an end elevation, a side elevation with some parts in vertical section, and an elevation in cross section taken in the plane indicated by line XI—XI in FIG. 9 as viewed in the arrow direction, which views are respectively similar to FIGS. 1, 2, 3, and 4, showing another example of a reactivation apparatus according to the invention.

DETAILED DESCRIPTION

Figure 1:
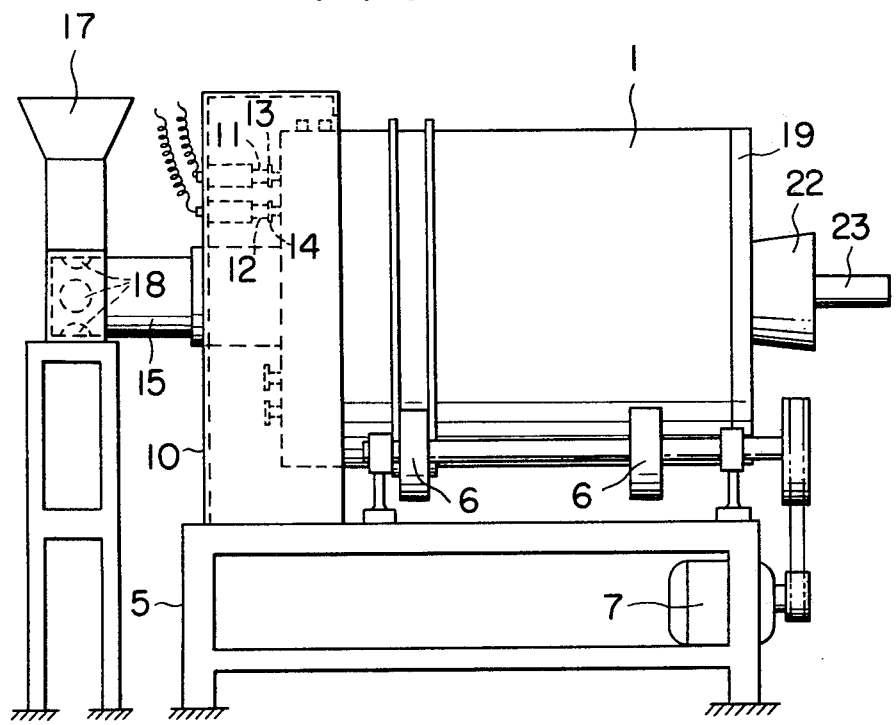
FIG. 1 is a side elevation of one example of a reactivation apparatus to which this invention can be applied.
Figure 2:
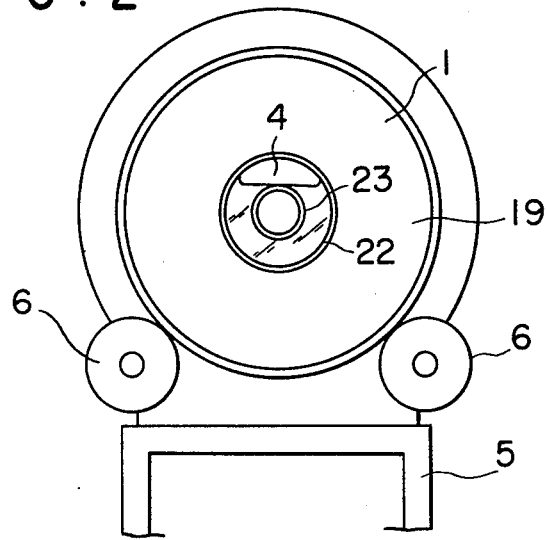
FIG. 2 is an end elevation of the apparatus shown in FIG. 1 as viewed from the right.

Referring first to FIGS. 1 through 4, the above mentioned reactivation apparatus to which this invention can be effectively applied has a cylindrical drum 1 made of an insulating drum 1 made of an insulating heat-resistant material and having at one end thereof a material feeding inlet 3 for feeding thereinto a material 2 to be reactivated and the other end thereof a material discharging outlet 4.

The drum 1 is rotatably supported with a horizontal axis on two pairs of rollers 6, which are fixed to respective horizontal shafts. These shafts in turn are rotatably supported on a base structure 5, and at least one of these shafts is driven by a motor 7. Thus, rotation can be imparted to the drum 1, which constitutes a rotary oven.

Figure 3:
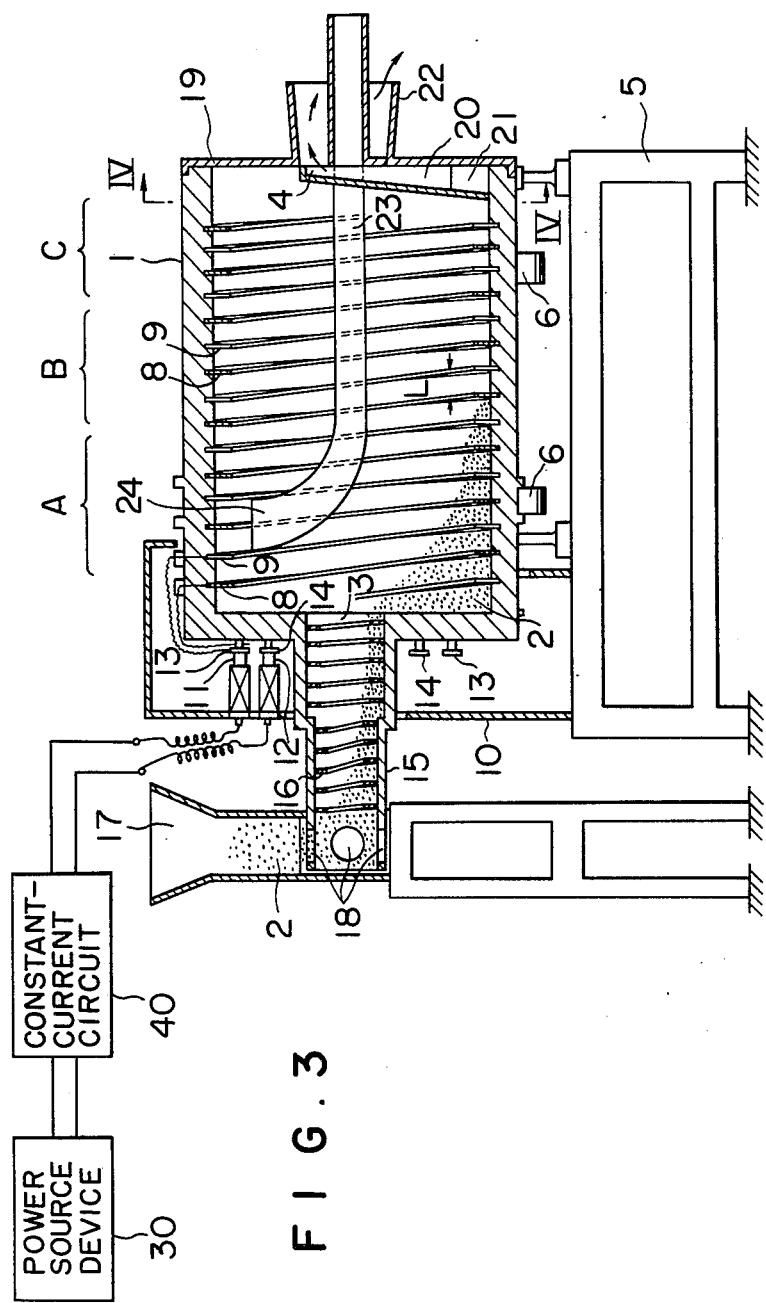
FIG. 3 is a side elevation, with some parts in vertical section, showing the internal construction of the apparatus illustrated in FIG. 1.
Figure 4:
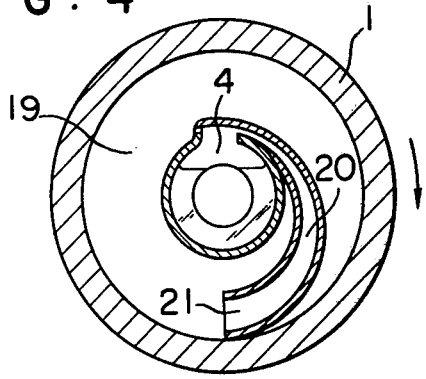
FIG. 4 is an elevation in cross section taken in the plane indicated by line IV—IV in FIG. 3 as viewed in the arrow direction.

As most clearly shown in FIG. 3, the drum 1 is provided around its inner wall surface, from one longitudinal end to the other end thereof, with an anode 8 and a cathode 9 in mutually interposed, helical form with a constant spacing L therebetween. The interior of this drum 1 may be considered to have, functionally, a drying zone A, firing zone B, and a reactivating zone C.

In a typical reactivation apparatus of this character, examples of specific quantities, when the drum 1 is made to have a diameter of 500 mm. and a length of 1,000 mm., are a height of the electrodes 8 and 9 projecting from the inner wall surface of the drum of 50 mm., a thickness of the electrodes 8 and 9 of 5 mm., an electrode spacing L of 50 mm., and a rotational speed of the drum 1 of 1.5 rpm.

A support frame 10 is provided on the side of the feeding inlet 3 and supports brushes 11 and 12 for electrical connection. At positions on the end wall of the drum 1 to coaxially confront these brushes 11 and 12, electrical contacts 13 and 14, respectively, are provided. These contacts 13 and 14 are electrically connected to the anode 8 and the cathode 9, respectively. Electric power is supplied to these electrodes, for example, at a voltage of 40V and a current of the order of 150 to 180A.

The inlet 3 for feeding the material 2 to be reactivated has a cylindrical part 15 which is of a diameter smaller than that of the drum 1 and is provided around its inner wall surface with a helical vane 16. This cylindrical part 15 receives through entrance openings 18 the material 2 to be reactivated which is supplied through a hopper 17. This material 2 is then conveyed into the drum 1 in a constant quantity for each revolution of the helical vane 16 accompanying each revolution of the drum 1. This constant conveyed quantity is so set that the material will not override or spill over the projecting edges of the electrodes 8 and 9.

The discharge end of the drum 1 is closed by an end plate 19. This end plate 19 is provided on its inner wall surface with a scroll-shaped guide passage structure 20 for scooping reactivated material which is spirally curved over an angular expanse of approximately 180° and has at its outer end a scooping inlet 21 with an opening directed in the rotational direction of the drum 1. The other inner end of the guide passage structure 20 is communicatively connected to the discharge outlet 4 formed in the central part of the end plate 19 at a position diametrically opposite from the scooping inlet 21. From the discharge outlet 4, a discharge cylinder 22 fixed to the end plate 19 and expanding slightly divergently extends outwardly from the drum 1 to discharge the reactivated material.

An exhaust gas pipe 23 for discharging steam and exhaust gases extends outward through the discharge cylinder 22 from the interior of the drum 1. This exhaust gas pipe 23 in the interior of the drum 1 extends horizontally toward the inlet 3 and then curves gently upward and terminates in an inlet 24 at the upper part of the aforementioned drying zone A. The outer discharge end of this exhaust gas pipe 23 is extended to a small-scale combustion device (not shown), where the exhaust gas is subjected to recombustion.

The apparatus of the above described construction operates as follows.

When the motor 7 is started to rotate the rollers 6, the drum 1 rollably supported thereon is rotated in one direction. At the same time, voltage is applied to the electrodes 8 and 9 through the sliding contact between the brushes 11 and 12 and the contacts 13 and 14.

On one hand, the material 2 to be reactivated, which has been supplied beforehand into the hopper 17, is fed through the entrance openings 18 into the cylindrical part 15, through which the material 2 is conveyed at a metered rate by the helical vane 16 and thus sent through the feeding inlet 3 into the interior of the drum 1.

The material 2 thus fed into the drum 1 is compulsorily conveyed toward the discharging outlet 4 by the screw-advancing action due to the rotation of the anode 8 and the cathode 9.

During this movement within the drum 1, the material 2 being reactivated is interposed between the anode and cathode 8 and 9 and, moreover, advances therebetween while maintaining a state wherein electrical conduction is continually occurring between the two electrodes 8 and 9. Consequently, generation of heat due to this electrical conduction and discharge is carried out continuously as the material 2 travels through the drying zone A, the firing zone B, and the reactivating zone C.

As a result of this electrical conduction and discharge, the temperature at the surface of the material 2 reaches an instantaneous high value of approximately 1,600° C. In this connection, it is a premise that the electrical conduction and discharge occurs frequently in the generation of joule heat in the individual parts of the material 2 as a whole as a result of the cumulative effect of local surface temperature rise. Then, as the drum 1 rotates, the material 2 is conveyed by and between the electrodes 8 and 9 thus travels while being always interposed between these electrodes, whereby the electrical conduction and discharge is accomplished continually and effectively. Furthermore, since the heating efficiency is high, emission of ultraviolet rays becomes pronounced and advantageously functions to decompose adsorption substances adsorbed on the material 2.

Figure 5:
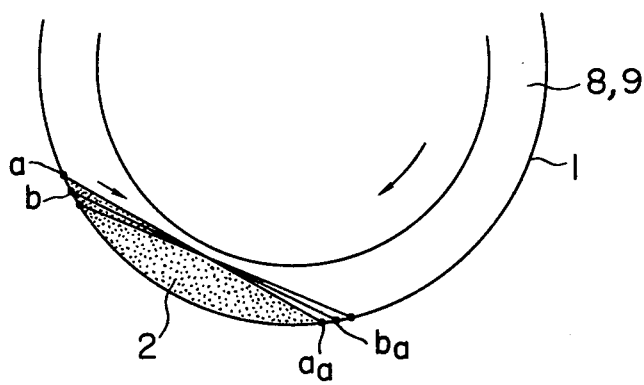
FIG. 5 is a partial elevation, as viewed in the axial direction of the cylindrical drum of the same apparatus, indicating the state of agitation or tumbling of material being reactivated.

At the same time, during the rotation of the drum 1, the material 2 adhering to the inner wall surface thereof is lifted as the drum rotates and is positioned with a slight slope as indicated in FIG. 5. The particles at the upper edge $a$ then slide downhill over the surface to the position of the lower edge $a_a$. Then, as the drum 1 continues to rotate, the particles at the succeeding upper edge $b$ similarly slide down to the position of the lower edge $b_a$. This tumbling action is repeated until, when the drum 1 has rotated through approximately $\frac{1}{8}$ revolution, the upper layer parts and the lower layer parts of the material 2 have been completely interchanged. Thus, this complete interchanging of layer parts occurs approximately 8 times for each revolution of rotation of the drum 1, that is, during the axial travel of one screw pitch between the electrodes 8 and 9, whereby thorough agitation is achieved. The combination of this thorough agitation and the above described electrical conduction and discharge process, which is continued also during this interchanging of layer parts, results in all parts of the material 2 being subjected uniformly to agitation and electrical conduction and discharge.

In the case of a stationary carbon layer interposed between stationary electrodes, a local linear short-circuiting state is indicated, and even if control of its supplied power is carried out, uniform heating of the entire material cannot be expected in all cases and is possible only in a carbon layer which is traveling by flowing between electrodes, as verified by experiments.

When the material 2 undergoing the above described process reaches the reactivating zone C from the firing zone B, it has been heated uniformly to a dark red color at approximately 700° to 750° C. and thus reaches the discharge end of the interior of the drum 1.

Here, with every revolution of the drum 1, the reactivated material 2 is scooped up through the scooping inlet 21 of the guide passage structure 20, and, as the drum 1 rotates further, this material 2 passes through the guide passage structure to the discharge outlet 4 and thence through the discharge cylinder 22 to be discharged to the outside. Since the interior of the guide passage 20 is closed by the material 2 once it has been scooped up, exhaust gases cannot pass through the passage 20 to be discharged outside. Furthermore, after the material 2 passing through the passage 20 has been discharged through the discharge outlet 4, the scooping inlet 21 is now at the lower part of the interior of the drum 1 where the concentration of the exhaust gases is low, and, therefore, almost no exhaust gases are exhausted through the passage 20.

With one unit of the above described reactivation apparatus, from 100 to 120 kgs. of active carbon can be reactivated daily. With two units, from 250 to 300 kgs. can be reactivated daily.

By the construction and operation of the reactivation apparatus according to this invention as described above, the generation of joule heat is effectively promoted to heat the material being reactivated, and since this material is always disposed between the two electrodes, the heating due to electric discharge is continuous, whereby the heating effect is remarkably heightened. Furthermore, because of the tumbling action of the material being reactivated due to the rotation of the cylindrical drum, the agitation effect is great, and uniform heating is afforded. Furthermore, since the material being reactivated is always positioned in interposed state between the two electrodes irrespective of the quantity of the material, there is no interruption of the electric discharge, and the reactivation efficiency can be increased remarkably.

A further feature is that the exhaust gas generated during the reactivation process can be purified and discharged as an odorless and harmless gas with a simple recombustion device, whereby the disposal of the exhaust gas is facilitated. Moreover, since the electric discharge is carried out through the reactivated material as it is forcibly moved by the helical electrodes in the horizontal apparatus, the effective distance through which this discharge takes place is more than three times the length of the cylindrical drum. Accordingly, the cylindrical drum can be made that much shorter, whereby the entire apparatus can be reduced remarkably in size and can be fabricated at low cost. As a result, the price of the reactivated material can be greatly lowered.

In the above described reactivation apparatus, it is necessary to provide electrical control of the supply of electric power to the electrodes. Otherwise, abnormal conduction and discharge may occur locally in some cases to overheat the material being reactivated, and, as a consequence, an abnormally large current will flow (since the electroconductivity of active carbon increases with increase in its temperature), and the temperature of the reactivated material will rise in a multiple manner until it gives rise to undesirable trouble such as explosive arc discharge.

This invention in another aspect thereof provides a reactivation apparatus wherein means are provided to control the power supplied thereto thereby to prevent the flow of current of a value above a specific limiting value, as described hereinbelow with respect to one example.

Figure 6:
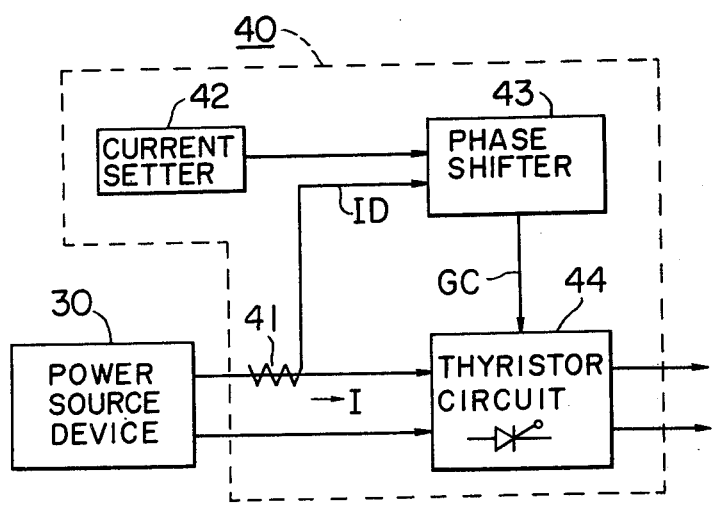
FIG. 6 is a block diagram showing a power source device, a power supply line for supplying power from the power source device to the electrodes of the apparatus, and a specific example of a constant-current circuit for limiting the current flowing through the supply line.

Preferring to FIG. 3, electric power is supplied from an electric power source device 30 to a constant-current circuit 40, and the resulting constant-current output of this circuit 40 is supplied to the brushes 11 and 12 described hereinbefore. One specific example of this constant-current circuit 40 as illustrated in FIG. 6 comprises: a current transformer 41 for detecting current flowing in the supply line from the power source device 30 and producing as output a current detection signal ID; a current setter 42 for setting an allowable current value (e.g., 100A); a phase shifter 43 for comparing this allowable current value and the current detection signal ID and producing as output a gate control signal GC corresponding to the deviation resulting from this comparison; and a thyristor circuit 44 installed in the supply line from the power source device 30 and having therein a thyristor gate which is plase controlled by the gate control signal GC, whereby the output of the thyristor circuit supplied to the reactivation apparatus is current controlled.

Thus, the current flowing through the electrodes 8 and 9 is prevented from exceeding the allowable value set by the current setter 42, whereby the aforedescribed trouble due to excessive current is prevented. The above mentioned the allowable current value is determined by factors such as the kind of material to be reactivated.

This invention in still another aspect thereof provides a reactivation apparatus provided with a device for supplying heating steam which operates effectively to supply heating steam into the oven chamber of the reactivation apparatus and to cause the material being reactivated to react effectively with the steam thereby to be reactivated.

In one example of this reactivation apparatus as illustrated in FIGS. 7 through 11, the principal parts of the apparatus structure, except for necessary modifications, are essentially the same as or similar to those of the first example described hereinbefore in conjunction with FIGS. 1 through 4. These like parts are designated by like reference numerals and characters and will not be described again in detail.

The rotary drum 1 of this apparatus is provided therewithin with an exhaust gas pipe 45 extending from its inner intake end 45a in the drying zone A, along the centerline of the drum 1, through the center of the material discharging outlet 4, out of the drum 1, and to a rotary joint 26 by which the outer end of the exhaust gas pipe 45 is connected to the inlet end of a suction pipe 25 connected at its other end to an exhaust fan (not shown). A steam supply pipe 47 is disposed coaxially around the exhaust gas pipe 45 in the zones B and C and over a part of the exhaust gas pipe 45 outside of the drum 1, a heating steam passage 46 being formed therebetween. The exhaust gas pipe 45 at a part thereof near its inner end 45a passes through a transverse partition wall 48 disposed between the drying zone A and the firing zone B and made of a heat-resistant material. The inner end 45a of the exhaust gas pipe 45 thus projecting into the drying zone A is provided with exhasut gas intake ports 49, 49. The other outer end of the exhaust gas pipe 45 connected to the above mentioned rotary joint 26 extends out of the steam supply pipe 47 at its outer end.

Figure 9:
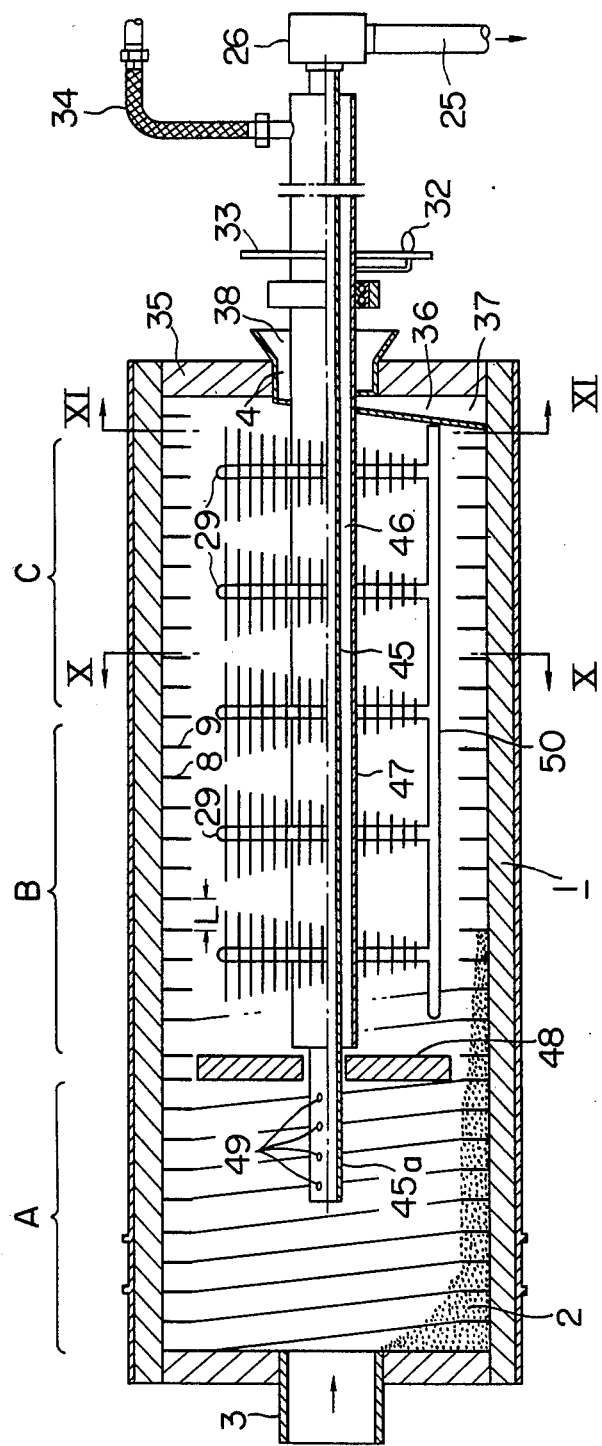
Figure 10:
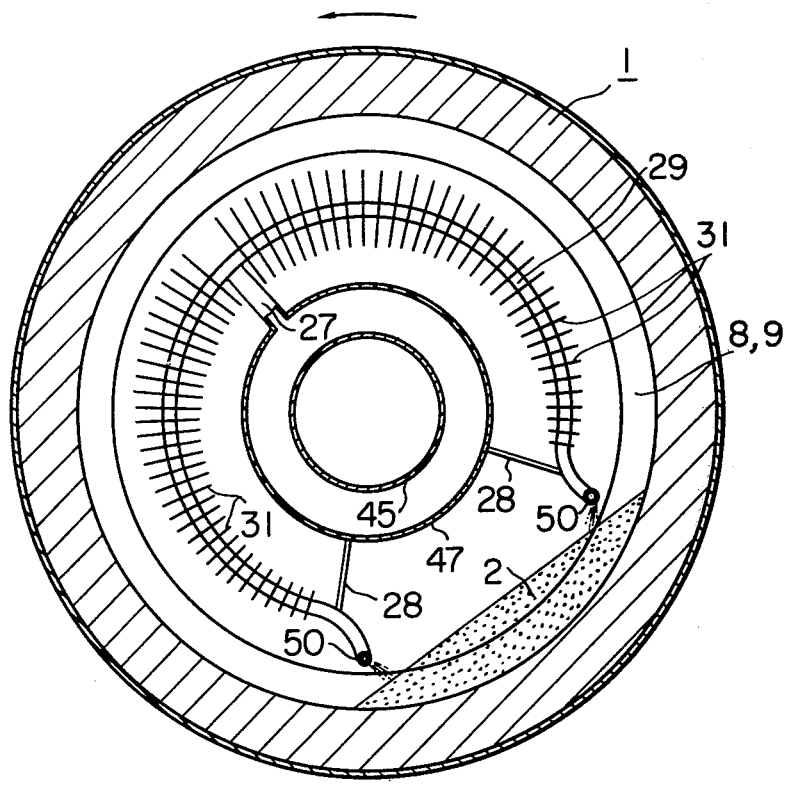
FIG. 10 is an elevation in cross section taken in the plane indicated by line X—X in FIG. 9 as viewed in the arrow direction.

The steam supply pipe 47 is rotatably supported in a manner permitting it to rotate freely around the exhaust gas pipe 45. As shown in FIGS. 9 and 10, the exhaust gas pipe 45 is communicatively connected through passages 27 to a plurality of branch tubes 29, 29, . . . of annular horse-show shape supported by support struts 28 to lie in transverse spaced apart planes and disposed in tandem arrangement in zones B and C in the interior of the rotary drum 1. To the ends of these branch tubes 29, 29, . . . on the two sides thereof, nozzle tubes 50, 50 are communicatively connected. These nozzle tubes 50, 50 are substantially parallel to the centerline axis of the drum 1 and have nozzle orifices confronting the aforedescribed electrodes 8 and 9 in the vicinity thereof. The positions of these nozzle tubes 50, 50 are respectively set to correspond to the positions of the upper and lower edges (positions $a$ and $a_a$ in FIG. 5) of the material 2 being reactivated between the electrodes 8 and 9 of the rotary drum 1. Furthermore, the branch tubes 29, 29, . . . are provided therearound with a large number of heat-absorption fins 31, 31, . . . for increasing the efficiency with which the branch tubes absorb the radiated heat within the rotary drum 1.

A handle 32 is fixed to the aforementioned steam supply pipe 47 at the part thereof projecting out of the drum 1 for the purpose of causing the steam supply pipe 47 to undergo rotational displacement thereby to vary and adjust the angular positions of the nozzle tubes 50, 50. Together with this handle 32, a calibrated scale plate 33 for indicating the angular positions of the nozzle tubes 50, 50 within the drum 1 is provided. Steam at a temperature of approximately 200° to 250° C. is delivered from a steam generating source (not shown) to the steam supply pipe 47 by a flexible steam delivery pipe 34 connected to the outer end of the steam supply pipe 47.

Figure 11:
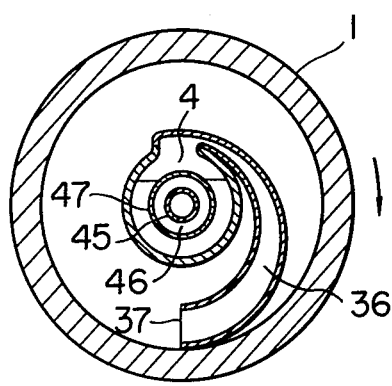

The end of the rotary drum 1 at which the material discharge outlet 4 is provided is closed by an end wall plate 35. On the inner wall face of this end wall plate 35, there is formed a scroll-shaped guide passage structure 36 for scooping out reactivated naterial which is spirally curved over an angular expanse of substantially 180 degrees as shown in FIG. 11 and has a scooping inlet 37 with an opening facing the direction of rotation of the drum 1. The outlet end of the guide passage structure 36 is communicatively connected to the material discharge outlet 4 at the center of the end wall plate 35 at an angular position diametrically opposite that of the scooping inlet 37. From this discharge outlet 4, the reactivated material is discharged out of the rotary drum 1 through a discharge cylinder 38 having a somewhat divergent outer end.

In the operation of the reactivation apparatus of the above described construction according to this invention, the general features, particularly the actions of feeding the material to be reactivated and propelling this material by the screw action of the electrodes 8 and 9 through the three zones A, B, and C as it is subjected to electric discharge between the electrodes, is essentially the same as those described hereinbefore with respect to the first embodiment of the invention. An additional feature of the instant example is that, in the firing zone B and the reactivation zone C, heating steam is supplied from the steam generating source (not shown) through the steam supply pipes 34 and 47.

As this steam flows from the supply pipe 47, through the branch tubes 29, 29, . . . , and thence to the nozzle tubes 50, 50, it absorbs radiated heat within the drum 1 and is rendered into superheated steam, which is injected through the orifices of the nozzle tubes 50, 50 against the material 2 being activated. As a result of this injection of the steam, an aqueous gas reaction occurs. More specifically, carburized substances contained in the inner depths of the material 2 being reactivated react with the steam and are subjected to reactivation action. The gases thus generated such as $H_2$, CO, and $CO_2$ pass by the partition wall 23 around the outer periphery thereof and are sucked into the exhaust gas pipe 45 through the intake ports 49, 49, . . . of the inner end 45a thereof in the zone A. These generated gases are thus conducted to means such as a recombustion device and thereby rendered into odorless and harmless gases, which are then discharged into the outer atmosphere.

The material 2 thus reactivated and reaching the discharge end of the drum 1 is scooped through the scooping inlet 37 of the guide passage structure 36 and is thus conducted through the guide passage structure, as the drum 1 rotates, to be discharged through the discharge outlet 4 and the discharge cylinder 38 similarly as in the aforedescribed first example. During this action, almost no gas escapes through the discharge path of the material 2 for the previously stated reasons.

The various advantageous features described hereinbefore of the first embodiment of the invention are possessed also by the instant example of the reactivation apparatus. In addition, the apparatus of the instant example is provided with a steam supply pipe and nozzle tubes which can be set at any desired angular position by manipulative control from the outside. Accordingly, superheated steam can be injected effectively against the material being reactivated thereby to promote the reactivation process. Moreover, since the steam within the steam branch tubes is heated by the radiant heat within the drum 1, it is efficiently superheated and serves to increase even more the effectiveness of the reactivation process.

While in the above described embodiments of the invention, two single-phase electrodes are used, the electrodes in the apparatus according to this invention are not thus limited, it being possible to use also three 3-phase electrodes. Furthermore, two or more anodes and corresponding cathodes may be used depending on the necessity.

I claim:

1. Apparatus for reactivation of a material, comprising: a hollow cylindrical drum made of heat-resistant material and supported rotatably about the centerline axis thereof, said drum having an inlet at one end thereof for feeding said material thereinto and an outlet at the other end thereof for discharging said material after reactivation therefrom; motive power means for driving the drum in rotation about said axis; helical electrodes of mutually different polarity disposed in mutually interposed helical state with a constant spacing therebetween around and along substantially the entire inner wall surface of the drum and fixed to said surface, said electrodes functioning upon rotation of the drum to propel by screw action the material from said inlet to said outlet; and means for supplying electric power to said electodes for causing electric discharge therebetween and conduction through the material being thus propelled thereby to subject the material sequentially to drying, firing, and reactivation as a result of electric discharge effect and the resulting joule heat.

2. Apparatus for reactivation as claimed in claim 1 in which said material is active carbon, and in which a constant-current circuit is provided in said means for supplying electric power and operates to prevent any current greater than a preset current value from flowing between the electrodes.

3. Apparatus for reactivation as claimed in claim 1 in which there is provided a steam injection system comprising steam generating means, a steam delivery line, a steam supply pipe supplied with steam from said steam generating means through said delivery line, nozzle devices disposed in the vicinity of said electrodes and said material being propelled and supplied with steam from said steam supply pipe thereby to inject steam against said material and thereby to promote the reactivation thereof, and means controllable from outside of the drum to adjust the positions of said nozzle devices, relative to the material and electrodes.

4. Apparatus for reactivation as claimed in claim 1 in which are provided means for feeding said material at a metered rate through said inlet and into the drum, an exhaust gas pipe for conducting out of the apparatus gases from a zone in which said drying is being carried out in the drum, and means for discharging the reactivated material, but not said gases, out of the drum.

5. Apparatus for reactivation as claimed in claim 3 in which said material is active carbon, and in which a constant-current circuit is provided in said means for supplying electric power and operates to prevent any current greater than a preset current value from flowing between the electrodes.

6. Apparatus for reactivation as claimed in claim 2 in which said means for supplying electric power comprises an electric power source device, contacts mounted on said drum and respectively connected to said electrodes, brushes mounted on a stationary structure and respectively contacting said contacts, a power supply line for supplying power from said power source device to said brushes, and said constant-current circuit installed in said power supply line.

7. Apparatus for reactivation as claimed in claim 2 in which said constant-current circuit comprises: a current transformer 41 for detecting current flowing in said power supply line and producing as the resulting output a current detection signal; a current setter for presetting said preset current value; a phase shifter for comparing said preset current value and said current detection signal and producing as output a gate control signal corresponding to any deviation resulting from this comparison; and a thyristor circuit connected in said supply line and having a thyristor gate which is phase controlled by said gate control signal thereby to current control the output of the thyristor circuit transmitted through the supply line to the brushes.

8. Apparatus for reactivation as claimed in claim 1 in which the centerline axis of the cylindrical drum is substantially horizontal.

* * * * *